United States Patent
Jansen et al.

(10) Patent No.: US 11,645,411 B2
(45) Date of Patent: May 9, 2023

(54) PRIVACY-AWARE SERVICE DATA MANAGEMENT

(71) Applicant: SAP SE, Walldorf (DE)

(72) Inventors: Maike Jansen, Wuppertal (DE); Raik Kulinna, Wiesloch (DE); Stephan Kessler, Linkenheim-Hochstetten (DE)

(73) Assignee: SAP SE, Walldorf (DE)

( * ) Notice: Subject to any disclaimer, the term of this patent is extended or adjusted under 35 U.S.C. 154(b) by 128 days.

(21) Appl. No.: 17/405,524

(22) Filed: Aug. 18, 2021

(65) Prior Publication Data

US 2023/0058906 A1    Feb. 23, 2023

(51) Int. Cl.
*G06F 21/00*    (2013.01)
*G06F 21/62*    (2013.01)

(52) U.S. Cl.
CPC .................. *G06F 21/6227* (2013.01)

(58) Field of Classification Search
None
See application file for complete search history.

(56) References Cited

U.S. PATENT DOCUMENTS

| | | | |
|---|---|---|---|
| 8,463,752 B2 * | 6/2013 | Brinkmoeller | G06F 21/6254 707/662 |
| 10,043,035 B2 | 8/2018 | Lafever et al. | |
| 2005/0080520 A1 | 4/2005 | Kline et al. | |
| 2007/0136237 A1 * | 6/2007 | Barker | G06F 21/6227 |
| 2012/0233129 A1 * | 9/2012 | Brinkmoeller | G06F 21/6254 707/662 |
| 2018/0004978 A1 * | 1/2018 | Hebert | G06F 16/2457 |
| 2019/0026490 A1 * | 1/2019 | Ahmed | G06F 21/6254 |
| 2019/0286848 A1 * | 9/2019 | Podlesny | G06N 7/01 |
| 2019/0347344 A1 * | 11/2019 | Kessler | G06F 11/3055 |

OTHER PUBLICATIONS

"Smart City With IOT and Big Data", Ferari, [Online], Retrieved from the Internet: <URL: http://www.ferari-project.eu/asset-smart-city-with-iot-and-big-data/>, (Accessed Sep. 27, 2022), 3 pgs.

Bitchkei, Silvia, "Can Data Privacy be Smart? An Introduction to Smart City Privacy", Hitachi Systems Security, [Online], Retrieved from the Internet: <URL: https://hitachi-systems-security.com/can-data-privacy-be-smart-an-introduction-to-smart-city-privacy/>, (Jan. 22, 2019), 4 pgs.

Wong, Kok-Seng, et al., "Towards Self-Awareness Privacy Protection for Internet of Things Data Collection", Journal of Applied Mathematics, vol. 2014, Article ID 827959, (2014), 9 pgs.

* cited by examiner

*Primary Examiner* — Maung T Lwin (74) *Attorney, Agent, or Firm* — Schwegman Lundberg & Woessner, P.A.

(57) ABSTRACT

In an example embodiment, using several computerized innovative data anonymization techniques, sensitive and personal data can be anonymized so that it can be used in further analysis without revealing the individuals to which the data applies. More particularly, a privacy view is created for a microdata table by generating one or more transformations, based on an anonymization method. Only once a request for data in the microdata table is received from a data consumer is the privacy view populated or repopulated with the most recent data from the microdata table by transforming it using the one or more transformations.

20 Claims, 7 Drawing Sheets

PRIVACY-AWARE SERVICE DATA MANAGEMENT

BACKGROUND

Telematics with Internet of Things (IoT) devices can serve as the basis for many new insights, statistical analyses, optimizations, and related operations. Recently, industries which utilize service technicians, such as waste management, have grown increasingly reliant on telematics, using information obtained from, for example, weight sensors, geo location sensors and vehicle driving data on weight collection trucks, radio frequency identification (RFID) chips or 1D/2D barcodes on household waste bins, and fill level sensors on dumpsters. Furthermore, mobile applications on the workers' smart devices adds additional data. Such telematics data from these disparate sources is then processed and stored centrally, such as in information technology (IT) systems of waste management companies or other professional service providers.

The collection, processing, and storing, however, of IoT data that is related to individual persons, such as customers and technicians (e.g., drivers and loaders), raises data protection challenges. Sensitive and personal data often fall under legal provisions requiring strict privacy protection that allow only a direct use of data for a specific purpose and with approval for the data process from the individual person. An example of such regulations is the European General Data Protection Regulation (GDPR).

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

A technical issue that arises with telematics data related to data in fields where a service is provided and both servicer (e.g., technician) and service (e.g., individual customer) data is maintained and analyzed is that it is difficult to anonymize sensitive and personal data so that it can be used for additional analysis purposes, such as statistical analysis and calculations of data insights, without revealing the identify of individuals. Data anonymization is to be understood here as the modification of personal data in such a way that the determination of the identity of the person concerned is excluded, or at least made significantly more difficult.

In an example embodiment, using several computerized innovative data anonymization techniques, sensitive and personal data can be anonymized so that it can be used in further analysis without revealing the individuals to which the data applies.

From a legal and public policy standpoint, it is often desirable to ensure that sensitive and personal data cannot be individually identifiable. From a technological standpoint, however, it can be difficult to define exactly what it means to be individually identifiable. Statistical summaries can reveal information about individuals, especially if an adversary possesses information about the concerned persons.

Additionally, an increasing number of customers of enterprise systems express their need to perform analyses on personal data while complying with data privacy legislation. An example of this would be customers from the waste management industry, and this shows that there is a demand for data anonymization solutions, which are seamlessly integrated into enterprise systems.

It should be noted that while an embodiment related to waste management is described in detail in this disclosure, the scope of the solutions is not limited to waste management and can be applied to any service technician-based industry.

Waste management itself comprises various business processes. These processes should be managed strategically and operationally while considering manifold influencing factors. Hence, the provision of the necessary data and the associated data insights for waste management purposes is an indispensable process. Moreover, unused data should be analyzed in the future for business planning, waste recycling, and especially for waste management logistics. In this context, financial losses, such as non-optimal utilization of existing personnel and technical capacities and non-optimal route planning, should be detected in order to derive effective actions.

In an example embodiment, smart waste management (SWM) techniques are provided that, combined with data optimization, contribute to the data privacy of individuals while allowing for improved data analytics.

When addressing the trade-off issue between data utility and data privacy, it is important to understand the general data privacy setting. A party or a company, e.g., the data controller, collects manifold data attributes necessary to perform its business (e.g., invoicing). However, often such data allows for many more insights. For example, the data controller could aim to make the data available to a third party, the data consumer, because the data consumer is a separate service provider that analyzes the data on behalf of the data controller (e.g., statistical institute, researcher, data scientist, etc.). The obtained benefit is to gain insights from the results of the performed analyses. These insights can be used by a waste management company, for instance, to optimize existing business processes. Hence, one goal in this setting is to use the collected (IoT) data not only for fulfilling the core business of the data controller but also for analytical and machine learning purposes. However, this sets the privacy of individuals at risk and is not in line with privacy legislation, such as the GDPR. So, when the data controller intends to provide data access to the data consumer, the data controller has to ensure that the data privacy requirements are met, which go beyond authorization and authentication mechanisms. Concurrently, the data consumer should be able to access the data while not being able to reveal personal information of individuals. In this regard, the first idea might be to simply remove identifier attributes, such as names. However, this approach would not be sufficient since unique combinations of the other attributes might allow for re-identification of individuals. Thus, a privacy-enhancing method (e.g., data anonymization) is needed that decouples the information from the individuals and meets the requirements of both parties (data controller and data consumer).

Apart from that, there are several types of data when discussing data privacy, namely microdata, tabular data, and queryable databases. Microdata refer to a record that contains information related to a specific individual (e.g., personal data). Tabular data are cross-tabulated values showing aggregate values for groups of individuals. Queryable databases are interactive databases to which a user can submit statistical queries (e.g., sum, average, clustering, predictive analytics, etc.). An example embodiment focuses on microdata, as it offers the highest level of flexibility in terms of privacy-enhancing methods. However, it is also the most challenging data release type when protecting the privacy of an individual's details. A microdata set can be represented as a table where each row refers to a different individual and each column contains information regarding one of the attributes collected. Attributes can be numerical (e.g., age, salary) or categorical (e.g., disease, gender). Moreover, the attributes of a microdata set can be classified into different categories, which are described in the following. The first classification distinguishes between Identifier and Quasi-Identifier attributes (QIDs), while the second classification differentiates between confidential and non-confidential attributes.

1. Attribute Classification:
    a) Identifier Attributes: Provide unambiguous re-identification of the individual to which the record refers (e.g., name).
    b) QIDs: Unlike an identifier, a quasi-identifier attribute alone does not lead to record re-identification. However, in combination with other quasi-identifier attributes, it may allow unambiguous reidentification of some individuals.
2. Attribute Classification:
    a) Confidential Attributes: Sensitive information about individuals, such as salary or health.
    b) Non-Confidential Attributes: Attributes that do not belong to any of the previous categories. This means that they do not contain sensitive information about individuals and cannot be used for record re-identification.

By keeping these attribute classifications in mind, the following disclosure risks in microdata sets can be understood in a more comprehensive way:
1. Identity Disclosure: Privacy is viewed as anonymity. An intruder is able to associate a record in the released dataset with the individual that originated it (e.g., re-identification).
2. Attribute Disclosure: Privacy is viewed as confidentiality. An intruder is able to determine the value of a confidential attribute of an individual with enough accuracy.

In an example embodiment, a system is provided that aims to reduce the stated disclosure risks, especially the identity disclosure, by applying data anonymization approaches.

More particularly, in an example embodiment, a combination of k-Anonymity and Differential Privacy techniques are utilized. K-Anonymity is a formal definition of a data privacy model based on grouping distinct combinations of attribute values in order to avoid linkage attacks, which can lead to identity disclosure. One way to achieve k-Anonymity is that each released record has at least (k−1) other records in the release whose values are indistinct over those fields that appear in external data. Hence, k-Anonymity offers privacy protection as it ensures that each released record will relate to at least k individuals even if the records are directly linked to external information. K-Anonymity may involve transforming microdata into a table in which all QIDs values are grouped into buckets, according to predefined anonymization settings. This is used to achieve k-anonymous subsets of tuples in the respective microdata set, where each subset contains at least k tuples with the same combination of QIDs values.

While k-Anonymity may be described as a privacy-enhancing technique, it is actually a definition of a data protection model but not a technique or anonymization method itself. In fact, data anonymization methods, such as data masking including generalization, suppression, and microaggregation, are used to achieve k-Anonymity.

On the downside, k-Anonymity may have some weaknesses, in that it can enable the following types of attacks to be executed on k-anonymized data:
1. Homogeneity Attack: This attack can occur when all values for a sensitive value within a set of k records are identical. If this is the case, the sensitive value for the set of k records may be exactly predicted, although the data has been k-anonymized.
2. Background Knowledge Attack: This attack is based on an association between one or more QIDs and the sensitive attribute in order to reduce the set of possible values for the sensitive attribute.

L-Diversity is an extension of k-Anonymity, which handles the homogeneity attack weakness by maintaining the diversity of sensitive attributes. In general, l-Diversity refers to a group-based anonymization approach that is used to preserve privacy in records by reducing the granularity of a data representation. This reduction is a compromise that leads to a certain loss of effectiveness of data management or mining algorithms to gain more privacy. L-Diversity tries to mitigate the risk of attribute disclosure by requiring a minimal level of variability in the sensitive attribute in each equivalence class. However, in some cases this is not sufficient as the dataset may be vulnerable to skewness and similarity attacks:

1. Skewness Attack: When the distribution of the sensitive attribute in the overall dataset is strongly skewed, satisfying l-Diversity may in fact be counter-productive as far as disclosure risk is concerned. For example, rare values, that reveal more information, may now become more frequent.
2. Similarity Attacks: Distinct values may have similar meanings, such as, for example, different types of stomach diseases. L-Diversity only helps if the values are semantically different.

T-Closeness represents a further extension of k-Anonymity and addresses the skewness attack weakness of l-Diversity by ensuring the distribution of each sensitive value remains about the same. The definition of t-Closeness may be "An equivalence class is said to satisfy t-Closeness if the distance between the distribution of a sensitive attribute in this class and the distribution of the attribute in the whole dataset is no more than a threshold t. A dataset is said to satisfy t-Closeness if every equivalence class in it satisfies t-Closeness." T-Closeness can be achieved by performing the following anonymization methods on data:
1. Perturbative Masking—Microaggregation: Additional constraint that the distance between the distribution of the confidential attribute within each of the clusters generated by microaggregation and the distribution in the entire dataset must be less than the threshold t.
2. Non-Perturbative Masking—Generalization/Suppression: It is possible to apply these methods by adding the t-Closeness constraint in the search for a feasible minimal generalization.

Differential Privacy (DP) is based on the assumption that an anonymization algorithm is an intermediate layer between the user submitting the queries and the database answering them. DP aims to maximize the accuracy of queries from statistical databases while minimizing the risks of re-identification of individuals whose data is stored in the respective dataset. The formal definition of DP is stated below:

Let $\varrho$ and $\delta$ be positive real numbers
Let A be a randomized algorithm
Takes a dataset as input and produces some output
Let Im(A) be the image of A, e.g., the set of all possible outputs
The algorithm A is ($\varrho$,$\delta$)-differentially private if
For all datasets X1 and X2 that differ on a single element (e.g., the data of one person)—
And for all subsets S of Im(A):

$$Pr(A(X1) \in S) \leq e^{\varrho} \times Pr(A(X2) \in S) + \delta$$

The probability is taken over the randomness used by A
One problem of DP is that there is often a big trade-off in usability vs. accuracy to obtain privacy. Privacy in this context comes from refutability, which means that there is a possibility that the data is false. An approach to deal with this problem is to add noise to the result of the query in such a way that it statistically cancels out but hides the individual values. Adding Laplace-distributed noise may be used for this purpose to disguise the result of queries.

In general, one can say the smaller the q the more noise gets added when applying DP to a certain dataset, and thus the higher the data privacy (as the noise aids in anonymization). However, this is just a rough declaration, because the actual degree of data privacy always depends on the size and the data contained in the respective dataset.

In general, the primarily goal of Local Data Privacy (LDP) is the same as of DP: Masking individual attribute values, which is done by adding noise to values of (numeric) attributes, derived from a probability distribution. LDP has been developed to disguise individual attribute values first before they are accessed by query operators for evaluation. So, the main difference of LDP in contrast to DP is that each user perturbs his or her data locally before sending it to a third party.

Data masking represents a data anonymization method, which is used within the implementation of the data anonymization approaches (k-Anonymity and DP) described above. Data masking means to modify data in such a way that the data remains readable and keeps its information structure in the best possible way. So, the application of data masking results in an anonymized dataset Y, which was generated by modifying the original records in dataset X. Thereby, the masking of QIDs is distinguished from confidential attributes:
1. Quasi-Identifier attributes: Identity behind each record is masked, which yields anonymity.
2. Confidential attributes: Values of the confidential data are masked, which yields confidentiality, even if the subject to whom the record corresponds might still be reidentifiable.

Moreover, there are two main data masking methods:
1. Perturbative Masking: Data is altered and changes should be such that the statistics computed on the perturbed dataset do not differ significantly from the statistics that would be obtained on the original dataset. Example techniques: noise addition, microaggregation, data/rank swapping.
2. Non-Perturbative Masking: Do not alter data and accept that data insights might get lost. Example techniques: generalization, suppression.

In an example embodiment, perturbative masking is the preferred data masking method, since waste management companies should be able to perform analyses on anonymized data that are optimized for minimal loss of information.

In an example embodiment, an in-memory database management system such as HANA®, from SAP SE of Frankfurt, Germany is utilized. An in-memory database is a database that relies primary on computer system main memory such as Random Access Memory (RAM) for data storage, in contrast with databases management systems that store data on hard drives such as disks or solid state designs (SSDs). Since main memory is faster to access than hard drives, the result is that an in-memory database permits faster data accesses and data processing than other types of database management systems.

Figure 1:
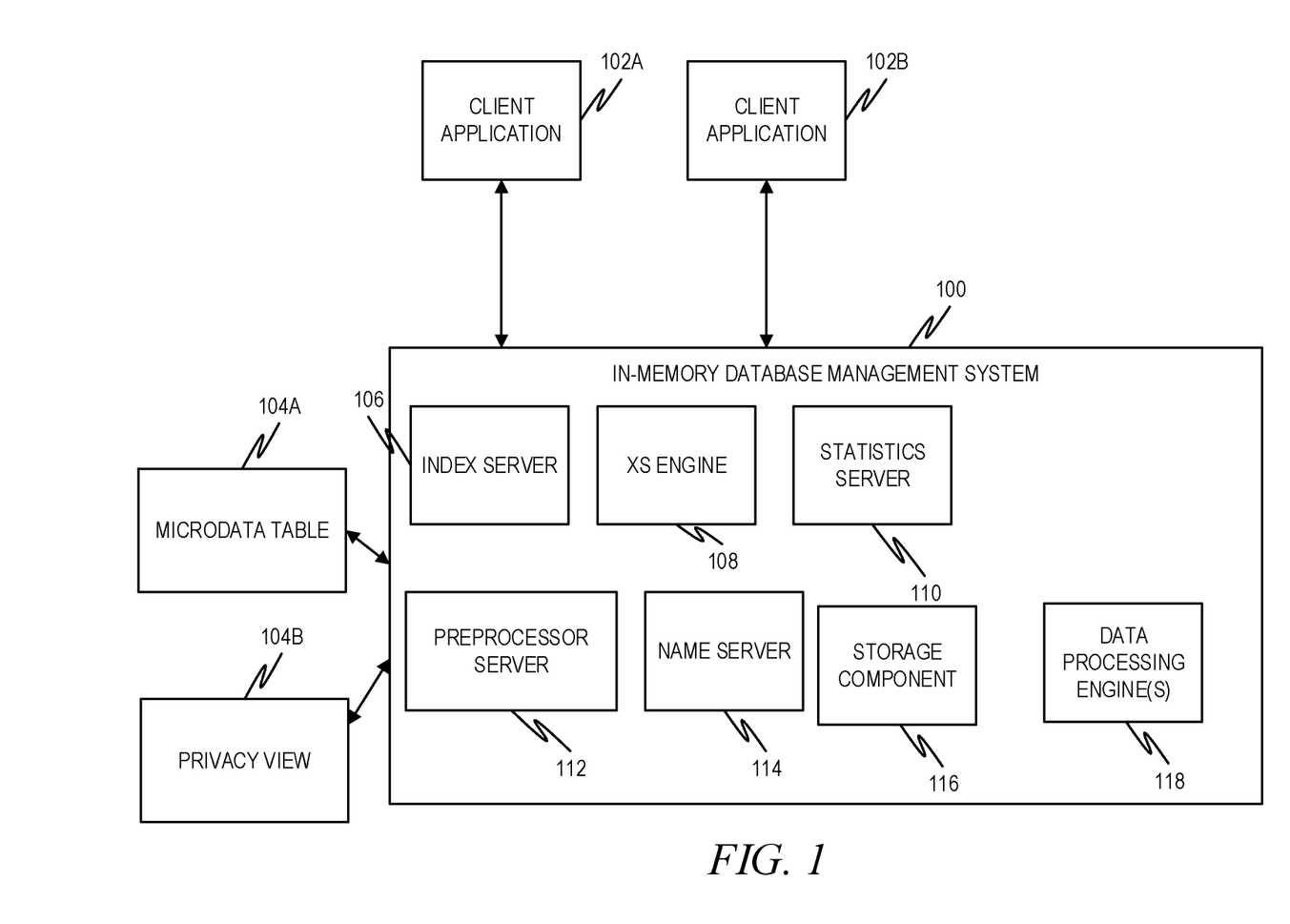
FIG. 1 is a diagram illustrating an in-memory database management system, including its client/external connection points, in accordance with an example embodiment.

FIG. 1 is a diagram illustrating an in-memory database management system 100, including its client/external connection points, in accordance with an example embodiment. It should be noted that one of ordinary skill in the art will recognize that sometimes an in-memory database management system 100 is also referred to as an in-memory database. Here, the in-memory database management system 100 may be coupled to one or more client applications 102A, 102B. The client applications 102A, 102B may communicate with the in-memory database management system 100 through a number of different protocols, including Structured Query Language (SQL) and Database Connectivity Application Programming Interfaces, Multidimensional Expressions (MDX), Representational State Transfer (REST), and Open Data Protocol (ODATA). In an example embodiment, the client application 102A corresponds to a data controller (an entity that controls the data), while client application 102B corresponds to a data consumer (an entity that consumes the data).

Also depicted are microdata table 104A and privacy view 104B, which will be described in more detail below.

The in-memory database management system 100 may comprise a number of different components, including an index server 106, an XS engine 108, a statistics server 110, a preprocessor server 112, a name server 114, a storage component 116, and data processing engine(s) 118. These components may operate on a single computing device or may be spread among multiple computing devices (e.g., separate servers).

The index server 106 contains the actual data and the engines for processing the data. It also coordinates and uses all the other servers.

The XS engine 108 allows clients to connect to the in-memory database management system 100 using web protocols, such as HTTP.

The statistics server 110 collects information about status, performance, and resource consumption from all the other server components. The statistics server 110 can be accessed to obtain the status of various alert monitors.

The preprocessor server 112 is used for analyzing text data and extracting the information on which text search capabilities are based.

The name server 114 holds information about the database topology. This is used in a distributed system with instances of the database on different hosts. The name server 114 knows where the components are running and which data is located on which server.

The storage component 116 the data, such as in column storage, row storage, or other types for unstructured data.

Data processing engine(s) 118 may include one or more components to process data, such as classic SQL, spatial processing, text processing, and predictive analytics components.

In an example embodiment, HANA® may be modified to extend it to k-Anonymity and Local Differential Privacy (LDP), to allow users to build applications with privacy protection. An in-memory database avoids performance bottlenecks of classic storage solutions for data anonymization use cases. Additionally, it may be further extended with l-Diversity as a third data privacy approach and with optional parameters for better controlling anonymization results. Additionally, so called Privacy Views can be created and accessed with extensions to SQL.

A Privacy View 104B exploits the view concept of relational Database Management Systems (DBMS) to define and access anonymized data. This allows the privacy views to directly benefit from an optimization and integration method. When a Privacy View 104B is generated, it initially only results in metadata being created in the DBMS to parameterize the chosen privacy-enhancing method. If queries are executed for Privacy Views 104B, HANA® decides at execution time if the existing data anonymization still meets the specified data privacy requirements when changes are made to the corresponding source tables. If no changes were made, the result of the anonymization is always the same, which means that the results are reproducible.

In general, there are two approaches to perform data transformations for privacy protection: (1) Transform the data first before querying the result, (2) Query the data first before transforming the query result. HANA® uses the first approach.

Figure 2:
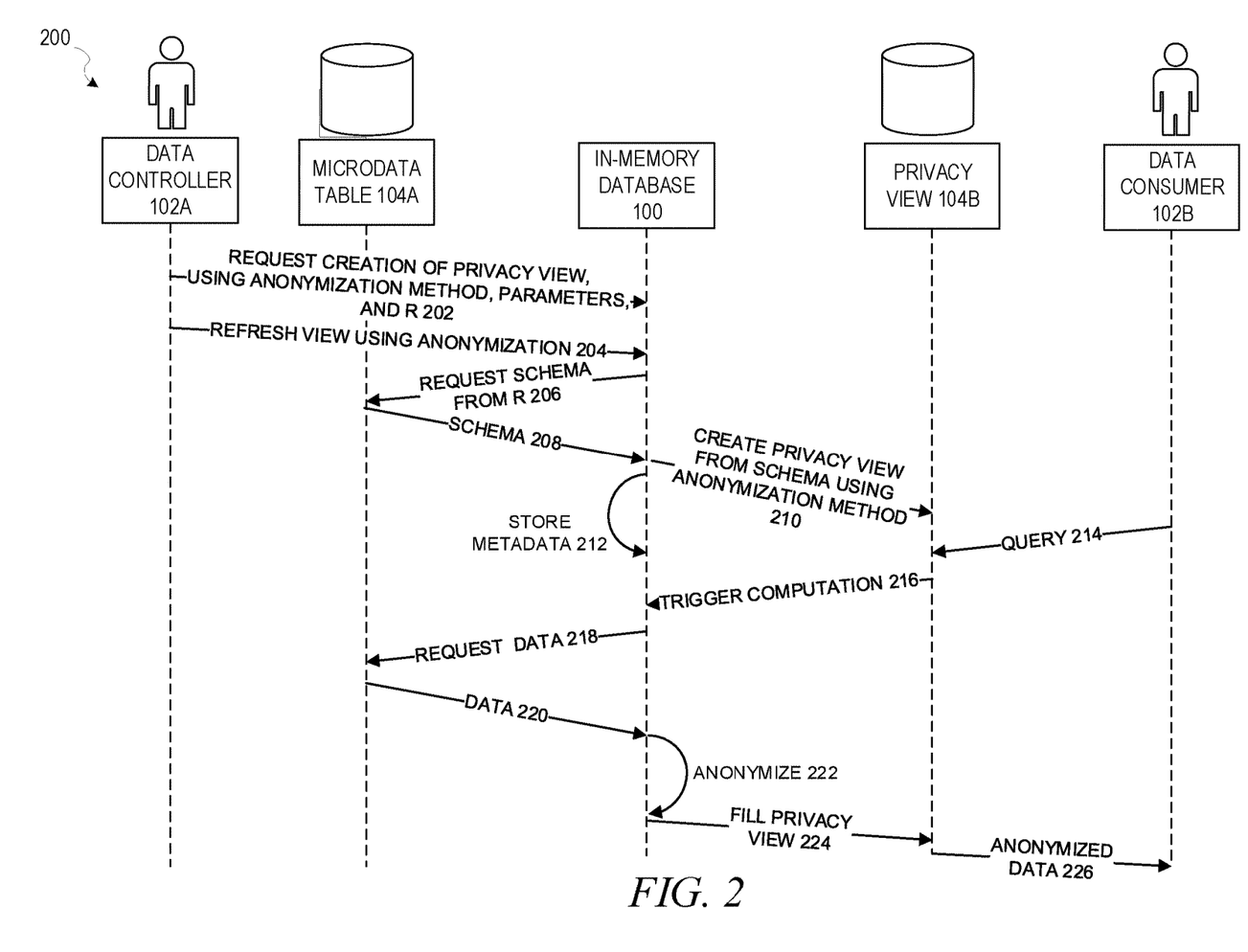
FIG. 2 is a ladder diagram illustrating an anonymization sequence when accessing personal data using an in memory database, in accordance with an example embodiment.

FIG. 2 is a ladder diagram illustrating an anonymization sequence 200 when accessing personal data using an in-memory database, in accordance with an example embodiment. The client application 102A for the data controller is responsible for the microdata table 104A, in which personal data is stored. The client application 102B for the data consumer receives permission to get access to this personal data. The client application 102B for the data consumer, however, may only access an anonymized version of this personal data. At operation 202, the client application 102A for the data controller requests creation of a privacy view from the in-memory database 100. It does this by specifying an anonymization method, a set of anonymization parameters, and R, with R being an identification of the microdata table 104A or a portion of the microdata table 104A. This basically indicates what privacy is required. At operation 204, the client application 102A for the data controller requests a refreshing of a view, specifying the anonymization method. This command directs the in-memory database 100 to obtain required metadata from R. At operation 206, the in-memory database 100 requests the schema from the microdata table 104A. This may include, for example, the organization of the data in the microdata table 104A (e.g., how many columns and what each column represents, e.g., the data types). It may also include any integrity constraints of the microdata table 104A. At operation 208, the schema is returned to the in-memory database 100.

Then, at operation 210, the in-memory database management system 100 creates a privacy view from the schema using the anonymization method and parameters. This includes creating one or more data transformations that are used to create the privacy view (e.g., to make the data anonymous). These data transformations may include, for example, aggregating data to a category at a higher level in a category hierarchy. For example, location data may be stored at a level in a location hierarchy that might include, from highest level to lowest level, country, state, county, city, address. If data in the microdata table 104A is stored at the address level, anonymization may include aggregating the data so that it is only viewable at the city level. How these data transformations are generated, and specifically how the hierarchical level is determined, will be described in more detail below.

For purposes of this disclosure, the hierarchy may be defined as a series of different levels of specificity of a particular data value, with the level of specificity increasing as one progresses down the hierarchy. In addition to the location hierarchy described above, another example can include customer type (e.g., residential vs. commercial, with the next level down perhaps being frequency of service, and the bottom level being a specific identification of the individual user). It should be noted that the identified anonymization method may be contained in a library accessible to the in-memory database 100, and thus in order to perform this and other steps involving the anonymization method, the in-memory database 100 may access this library.

At operation 212, the in-memory database 100 stores metadata, which includes the one or more data transformations. The moment the data consumer queries the personal data in the privacy view 104B at operation 214, a computation is triggered in the in-memory database management system 100 at operation 216. Then, at operation 218, the in-memory database management system 100 requests data from the microdata table 104A and receives it at operation 220. At operation 222, the in-memory database management system 100 applies a privacy enhancing method by performing the stored one or more data transformations on the newly received data to anonymize it.

At operation 224, the in-memory database management system 100 fills the privacy view 104B with the anonymized data. The data consumer 102B can then view the anonymized data from the privacy view 104B at operation 226.

Figure 3:
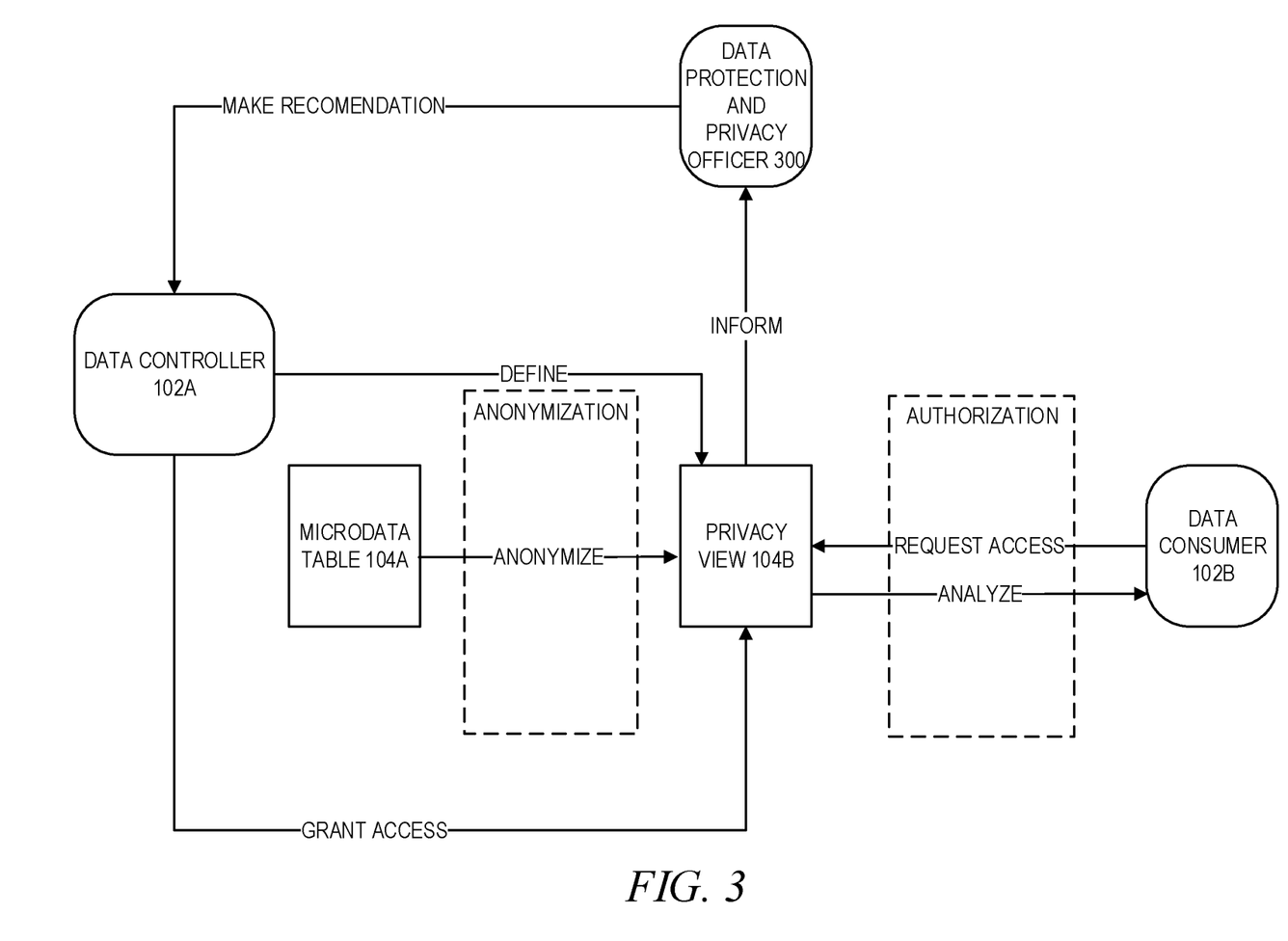
FIG. 3 is a block diagram illustrating the providing of access to personal data, in accordance with an example embodiment.

FIG. 3 is a block diagram illustrating the providing of access to personal data, in accordance with an example embodiment. In general, organizations collect data, which often includes personal data. If the legal basis for the processing of personal data defined by legislation, such as the GDPR, is not fulfilled, the process of providing access involves having each individual data processing purpose be explicitly confirmed by the customer (e.g., each data processing purpose must be specified and mentioned in the general terms and conditions).

In contrast, in an example embodiment, as depicted in FIG. 3, data anonymization is provided. Data anonymization has the advantage that it is always possible without having to obtain the general consent of the concerned individuals. In addition, even if the requested data processing purposes have been confirmed by the concerned persons, the data may not subsequently be further analyzed and used for statistical evaluations or similar purposes. Generally speaking, any processing of personal data is GDPR-relevant.

Here, the client application 102B for the data consumer requests the definition of a Privacy View 104B in order to access personal data for data analysis. The client application for the data controller 102A defines and aims to fulfill the requested Privacy View 104B. Separately, a Data Protection and Privacy Officer (DPPO) 300 may be informed about how the Privacy View has been defined. The DPPO then either agrees or disagrees with the definition. If it disagrees, the client application for the data controller 102A redefines and aims to fulfill the requested Privacy View 104B.

Otherwise, the client application for the data controller 102A gives the client application 102B for the data consumer access to the Privacy View 104B. The client application 102B for the data consumer can now perform data analysis on the requested Privacy View 104B.

When taking a closer look at the improved process of providing access to personal data, it must be noted that a data utility parameter may be determined and handed over by the data consumer, which defines the minimum data utility of the anonymized data and thus a maximum deviation range from the original data. This deviation range is the deviation in terms of data utility between the original data and the anonymized data. The baseline for the maximum data utility is the original data, while the anonymized data is likely to have a reduced data utility compared to the original data. This is the case because data privacy often leads to tradeoffs regarding data utility. In order to determine a sufficient data privacy level, with respect to the obtained data utility level, two approaches are described herein: one for the application of LDP, and one for the application of k-Anonymity.

It is important to state that the data utility level primarily matters if data anonymization is not legally required. If this is the case, a company chooses to use data anonymization in order to proactively support the principle of data minimization. Thus, the respective company should not experience information loss, or at least only to an acceptable extent. Otherwise, if data anonymization is mandatory for the analysis of the respective data, the DPPO gives recommendations on the legal conditions and appropriate measures.

Within HANA®, it is possible to create a Privacy View using the k-Anonymity data privacy approach. This is realized in form of an SQL statement for which several parameters have to be set. First, k is defined as a positive integer which is greater than 1 (k>1). Second, a sequence attribute is set, as for instance the attribute ID. This sequence attribute is used for technical reasons, but could be excluded from the Privacy View, after data anonymization, in order to avoid background knowledge attacks. Third, at least one QID is specified including the respective Generalization Hierarchy (GH). A GH describes a scheme for the values of a QID. It allows the values to be replaced by a higher-level group until each group in the data set contains a specified minimum number of members (e.g., k). The GH can explicitly be specified by defining the values of each level of the hierarchy in a data source table. Another option for creating a GH is a so-called GH function. Thereby, a GH is created at runtime based on the algorithm defined in the GH function and the content of the specified column.

Additionally the number of GH levels is defined in the form of a natural number in the range $[1-\infty]$. HANA® then determines the optimal GH level for each QIDs at runtime with the least information loss using a FLASH algorithm. FLASH is based on the INCOGNITO algorithm, which is an algorithm for a NP-hard optimization problem. Moreover, it is possible to set min and max parameters for each QID. These parameters are optional. The min parameter defines the minimum GH level while the max parameter defines the maximum GH level of a QID.

In an example embodiment, LDP is the second data privacy approach that is implemented in HANA®. A Privacy View can also be created using an SQL method for which several parameters are set. First, as for k-Anonymity, a Sequence Column is stated. Afterwards, only one single attribute is defined as the sensitive attribute (e.g., the noised column). If several attributes should be noised, then it is possible to create several Privacy Views that are based on each other. Additionally, the parameters epsilon $\varrho$ and sensitivity are defined for the sensitive attribute. Within HANA®, LDP uses the additional Runtime Property Seed to generate noise together with the value of the Sequence Column for each value of the sensitive attribute in a reproducible manner. The Seed value gets determined with the first use of a Privacy View.

In an example embodiment, an appropriate data privacy level may be determined, whether or not HANA® or another in-memory database is used. An appropriate data privacy level can be determined for k-Anonymity if data anonymization is not legally required as follows:
1. Define the QIDs.
2. The data consumer determines the minimum data utility by defining the maximum GH level for each QID.
3. Set parameter k=3, since this is a commonly used benchmark for k.
4. Run k-Anonymity on the respective dataset with the defined QIDs.
5. Check results and examine if the minimum data utility is satisfied (e.g., if the maximum GH level for each data attribute is not exceeded).
6. If satisfied: Increase k or stop if optimal value of k is already determined.
   Otherwise: Reduce k.
   Note: k must not be smaller than 2.
7. If k has been modified in step 6: Return to step 4.

In an example embodiment, an appropriate data privacy level for LDP may be determined if data anonymization is not legally required as follows:
1. Data consumer defines the minimum data utility for the respective use case by determining the maximum deviation for the sensitive attribute(s).
2. Apply the so-called Bootstrap algorithm, which calculates the deviation range for a specific epsilon $\varrho$ and a certain sensitivity value. Start with the mean value of the $\varrho$ range, which goes from 0.01 to 10, and search for the optimal value of $\varrho$ by using binary search
3. Set LDP-parameter $\varrho$ to the (in step 2) determined value and run LDP on the respective dataset.
4. Evaluate the results by running statistical functions (e.g., sum or average) on the anonymized dataset.

Figure 4:
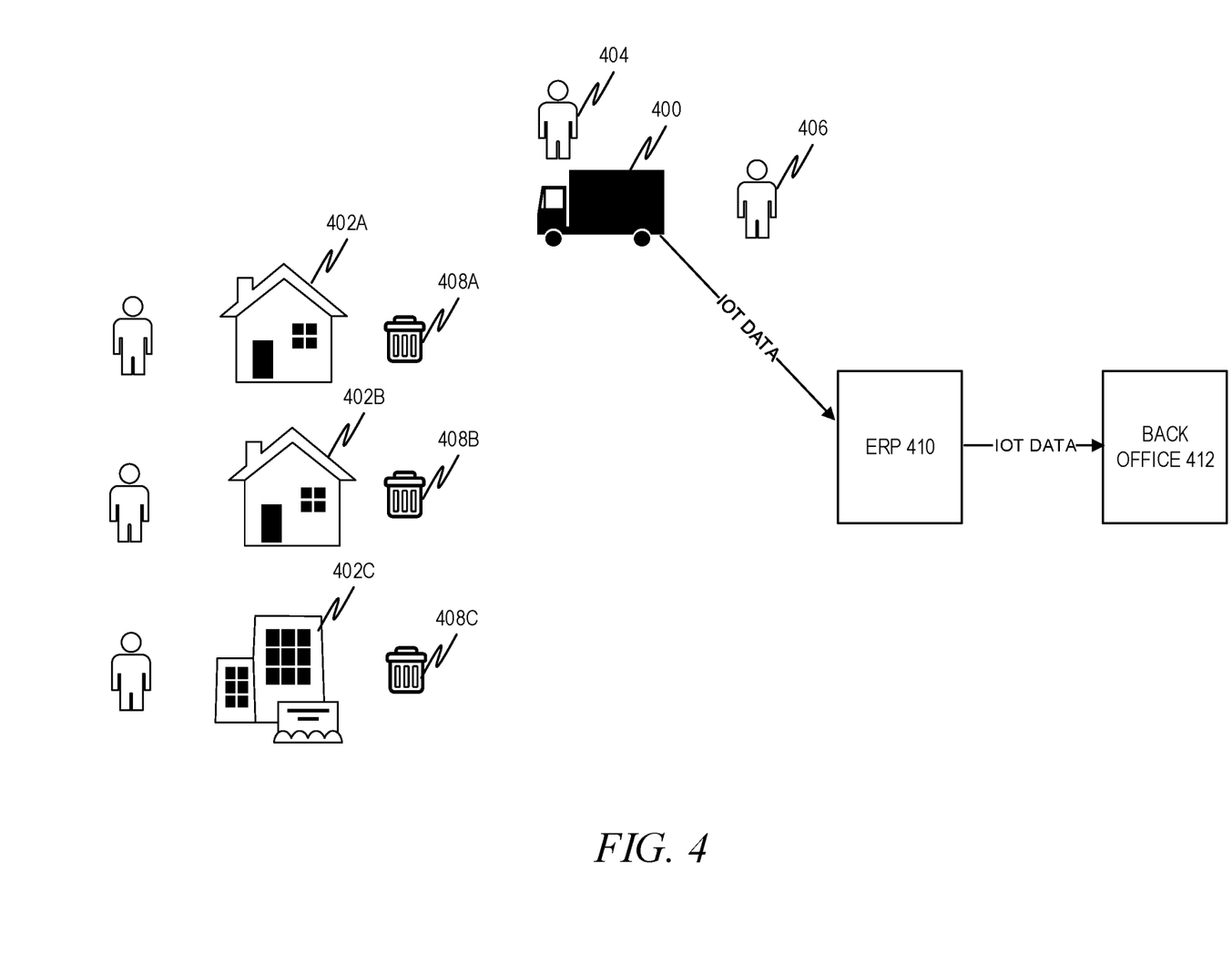
FIG. 4 is a block diagram depicting a simplified general waste collection process with a focus on the collected personal data, in accordance with an example embodiment.

As mentioned above, the techniques described herein may be utilized in an example field such as smart waste management or other types of customer related services. FIG. 4 is a block diagram depicting a simplified general waste collection process with a focus on the collected personal data, in accordance with an example embodiment. The focus in FIG. 4 is on private household waste and includes the use of telematics (IoT) technology installed on the waste collection truck as well as a container identification system. The process works as follows: The waste collection truck 400 drives from household 402A to household 402B to household 402C, driven by a driver 404 with a loader 406 collect the respective waste containers 408A, 408B, 408C. Each container 408A, 408B, 408C is equipped with an identification transponder, such as an RFID chip or a (2D/3D) barcode. Moreover, a container identification system is used to scan the container identification transponder and map the received information to a specific customer. Geo fencing of the location with help of smart devices in the truck or at workers are another approach for identification of containers.

Notably, customer-related data as well as employee-related data are collected in this waste collection process example. These are collected and stored as (IoT) data and maintained in an Enterprise Resource Planning (ERP) software system 410. The ERP software may use a database management system such as HANA to persist the data, although other options for persistency are possible as well, such as IoT platforms, data warehouses, and data lakes. With regard to route planning, there are two types, namely static and strategic route planning, and, secondly, daily short-term route planning. The first one is used to plan the waste calendar for a certain collection area. Through the executing of the second type, the optimal task list for one specific day gets dynamically determined by involving waste and logistic related data in the calculation basis. If the optimal route does not include all containers to be emptied, a separate route is defined.

In an example embodiment, various pieces of information are gathered during the waste collection process via the on-board computer, including geolocations for instance from the Global Positioning System (GPS), such as: (1) time recording of the vehicle and of the entire route, (2) route distance, (3) work time recording of drivers and loaders (modern log-in and log-out in the on-board computer), and (4) refueling operations. Moreover, in the process of scanning RFID chips or 2D/3D barcodes can be bound to the current geolocations and time stamp of the waste collection data record. Additionally, weight recording of the collected waste is determined at the weighing unit in the truck. There, the net weight of the collected waste gets calculated from gross weight and the empty container weight (e.g., the tare weight).

The collected IoT data is transferred to the back office 412 for invoicing, analytics, controlling, and additional purposes. There, the net weight is converted or estimated for the individual containers (estimation from a controlling perspective). Moreover, the working times are transferred to the Human Resources system (time sheet application) and the controlling system (labor cost in profitability analysis). Machine usage data is forwarded to the controlling system (e.g., fuel calculation, maintenance, refueling). This data is then included in the calculation of the profitability. In addition, negative confirmation, e.g., that the operation could not be carried out completely, is transferred to the complaint deviation system. Possible reasons for complaints are predefined in the handheld device of the loaders, such as: (1) damaged container, (2) incorrect filling, and (3) container was not positioned correctly. In these cases, no action of the waste management company is possible, or only a possible marking by slip of paper at the waste container and the recording in the system with the handheld device of the loader.

In summary, the exemplary waste collection process leads to two data privacy aspects: On the one hand, there is the data privacy of the customers and on the other side there is the data privacy of the employee-related data, such as the recording of the working time. However, this personal data should be used for several purposes and use cases, such as for analytics and invoicing. While the processing of the collected, personal data is permitted for invoicing, the use of this data is protected by the GDPR for analytical and predictive purposes. This is because further data analytics are not directly part of the core process of waste collection management.

Moreover, there are further (third) parties which aim to analyze the collected data for optimization purposes, performance benchmarking or statistics, for example. However, due to legal restrictions, such as the GDPR, these (third) parties are not always allowed to receive and process personal data collected by waste management companies. On the one hand, this protects the privacy and identity of the individuals. On the other hand, it prevents the use of the data for social objectives, such as sustainability benchmarking.

Figure 5:
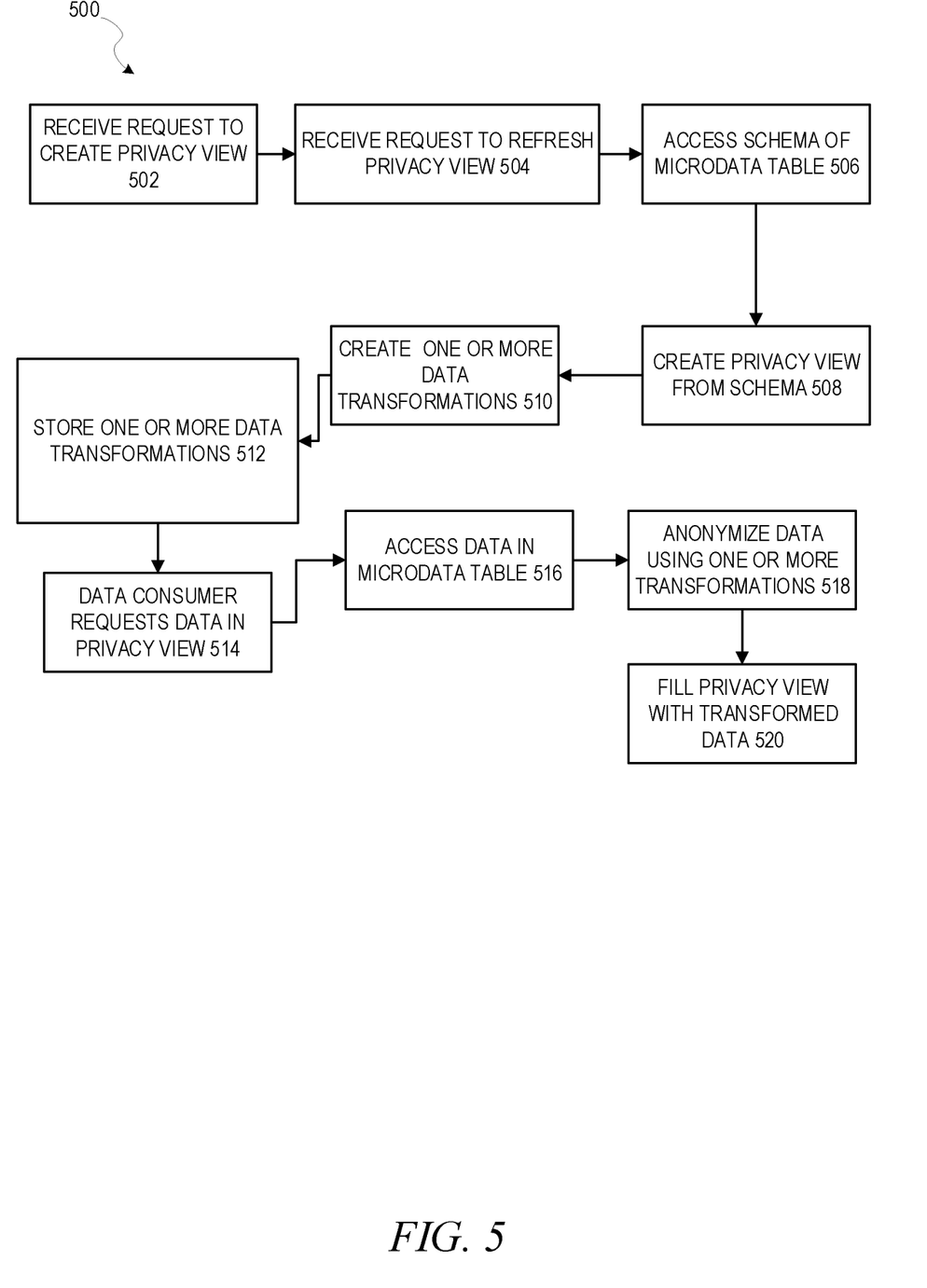
FIG. 5 is a flow diagram illustrating a method, in accordance with an example embodiment.

FIG. 5 is a flow diagram illustrating a method 500 in accordance with an example embodiment. At operation 502, a request is received, from a data controller, to create a privacy view for a microdata table. The request includes an identification of an anonymization method, one or more anonymization parameters, and an identification of the microdata table. At operation 504, a request to refresh the privacy view is received from the data controller. Operations 506-512 are then performed in response to the receiving of the request to refresh the privacy view. At operation 506, a schema of the microdata table is accessed using the identification of the microdata table. At operation 508, a privacy view is created from the schema using the identified anonymization method. At operation 510, one or more data transformations for data in the microdata table are generated, based on the identified anonymization method and the one or more anonymization parameters.

At operation 512, the one or more data transformations are stored. At operation 514, a data consumer requests data in the privacy view. Operations 516-520 are performed in response to this request. At operation 516, data in the microdata table is accessed using the identification of the microdata table. At operation 518, the data is anonymized by transforming the data using the one or more data transformations. At operation 520, the privacy view is filled with the transformed data.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
receiving, from a data controller, a request to create a privacy view for a microdata table, the request including an identification of an anonymization method, one or more anonymization parameters, and an identification of the microdata table;
receiving, from the data controller, a request to refresh the privacy view; and in response to the receiving of the request to refresh the privacy view:
  accessing a schema of the microdata table using the identification of the microdata table:
  creating a privacy view from the schema using the identified anonymization method;
  generating one or more data transformations for data in the microdata table, based on the identified anonymization method and the one or more anonymization parameters;
  storing the one or more data transformations;
in response to a data consumer requesting data in the privacy view:
  accessing data in the microdata table using the identification of the microdata table;
  anonymizing the data by transforming the data using the one or more data transformations; and
  filling the privacy view with the transformed data.

Example 2. The system of Example 1, wherein the microdata table corresponds to a service and stores service data having information about one or more servicers having provided the service and one or more customers having received the service.

Example 3. The system of Examples 1 or 2, wherein the operations are performed by an in-memory database management system.

Example 4. The system of any of Examples 1-3, wherein the one or more data transformations include aggregating data stored at a first level of a category hierarchy so that it is transformed to data stored at a second level of the category hierarchy, wherein the second level is a higher level than the first level.

Example 5. The system of any of Examples 1-4, wherein the anonymization method is k-Anonymity and the one or more anonymization parameters include a value for k.

Example 6. The system of Example 5, wherein the one or more anonymization parameters further include a sequence attribute.

Example 7. The system of Example 4, wherein the one or more anonymization parameters further include one or more quasi-identifier attributes specified at a particular level in a generalization hierarchy.

Example 8. A method comprising:
receiving, from a data controller, a request to create a privacy view for a microdata table, the request including an identification of an anonymization method, one or more anonymization parameters, and an identification of the microdata table;
receiving, from the data controller, a request to refresh the privacy view; and
in response to the receiving of the request to refresh the privacy view:
  accessing a schema of the microdata table using the identification of the microdata table:
  creating a privacy view from the schema using the identified anonymization method;
  generating one or more data transformations for data in the microdata table, based on the identified anonymization method and the one or more anonymization parameters;
  storing the one or more data transformations;
in response to a data consumer requesting data in the privacy view:
  accessing data in the microdata table using the identification of the microdata table;
  anonymizing the data by transforming the data using the one or more data transformations; and
  filling the privacy view with the transformed data.

Example 9. The method of Example 8, wherein the microdata table corresponds to a service and stores service data having information about one or more servicers having provided the service and one or more customers having received the service.

Example 10. The method of Examples 8 or 9, wherein the method is performed by an in-memory database management system.

Example 11. The method of any of Examples 8-10, wherein the one or more data transformations include aggregating data stored at a first level of a category hierarchy so that it is transformed to data stored at a second level of the category hierarchy, wherein the second level is a higher level than the first level.

Example 12. The method of any of Examples 8-11, wherein the anonymization method is k-Anonymity and the one or more anonymization parameters include a value for k.

Example 13. The method of Example 12, wherein the one or more anonymization parameters further include a sequence attribute.

Example 14. The method of Example 11, wherein the one or more anonymization parameters further include one or more quasi-identifier attributes specified at a particular level in a generalization hierarchy.

Example 15. A non-transitory machine-readable medium storing instructions which, when executed by one or more processors, cause the one or more processors to perform operations comprising:
receiving, from a data controller, a request to create a privacy view for a microdata table, the request including an identification of an anonymization method, one or more anonymization parameters, and an identification of the microdata table;
receiving, from the data controller, a request to refresh the privacy view; and
in response to the receiving of the request to refresh the privacy view:
  accessing a schema of the microdata table using the identification of the microdata table:
  creating a privacy view from the schema using the identified anonymization method;
  generating one or more data transformations for data in the microdata table, based on the identified anonymization method and the one or more anonymization parameters;
  storing the one or more data transformations;
in response to a data consumer requesting data in the privacy view:
  accessing data in the microdata table using the identification of the microdata table;
  anonymizing the data by transforming the data using the one or more data transformations; and
  filling the privacy view with the transformed data.

Example 16. The non-transitory machine-readable medium of Example 15, wherein the microdata table corresponds to a service and stores service data having information about one or more servicers having provided the service and one or more customers having received the service.

Example 17. The non-transitory machine-readable medium of Examples 15 or 16, wherein the one or more data transformations include aggregating data stored at a first level of a category hierarchy so that it is transformed to data stored at a second level of the category hierarchy, wherein the second level is a higher level than the first level.

Example 18. The non-transitory machine-readable medium of any of Examples 15-17, wherein the anonymization method is k-Anonymity and the one or more anonymization parameters include a value for k.

Example 19. The non-transitory machine-readable medium of Example 18, wherein the one or more anonymization parameters further include a sequence attribute.

Example 20. The non-transitory machine-readable medium of Example 17, wherein the one or more anonymization parameters further include one or more quasi-identifier attributes specified at a particular level in a generalization hierarchy.

Figure 6:
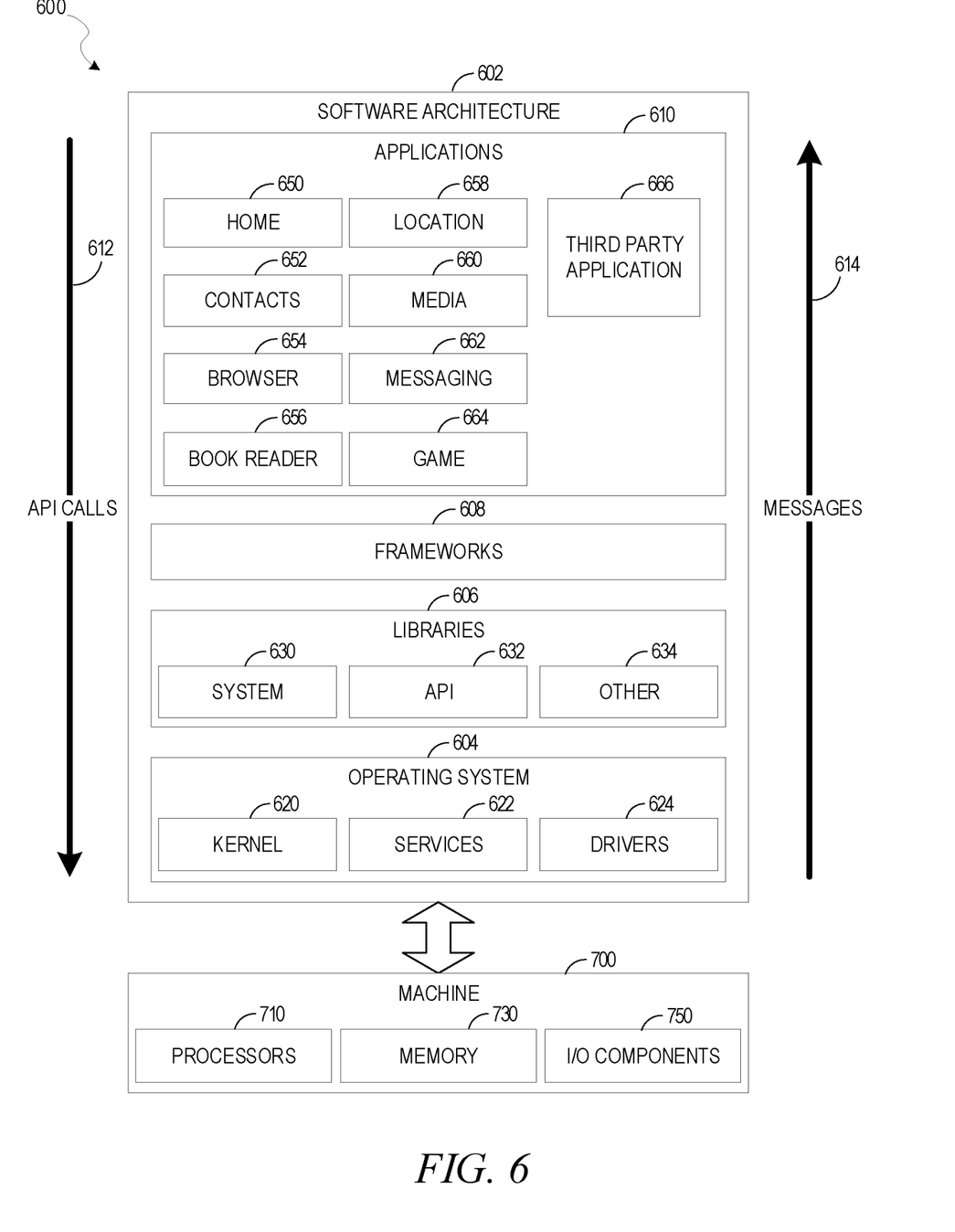
FIG. 6 is a block diagram illustrating an example architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke Application Program Interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. The applications 610 can are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 666 can invoke the API calls 612 provided by the operating system 604 to facilitate functionality described herein.

Figure 7:
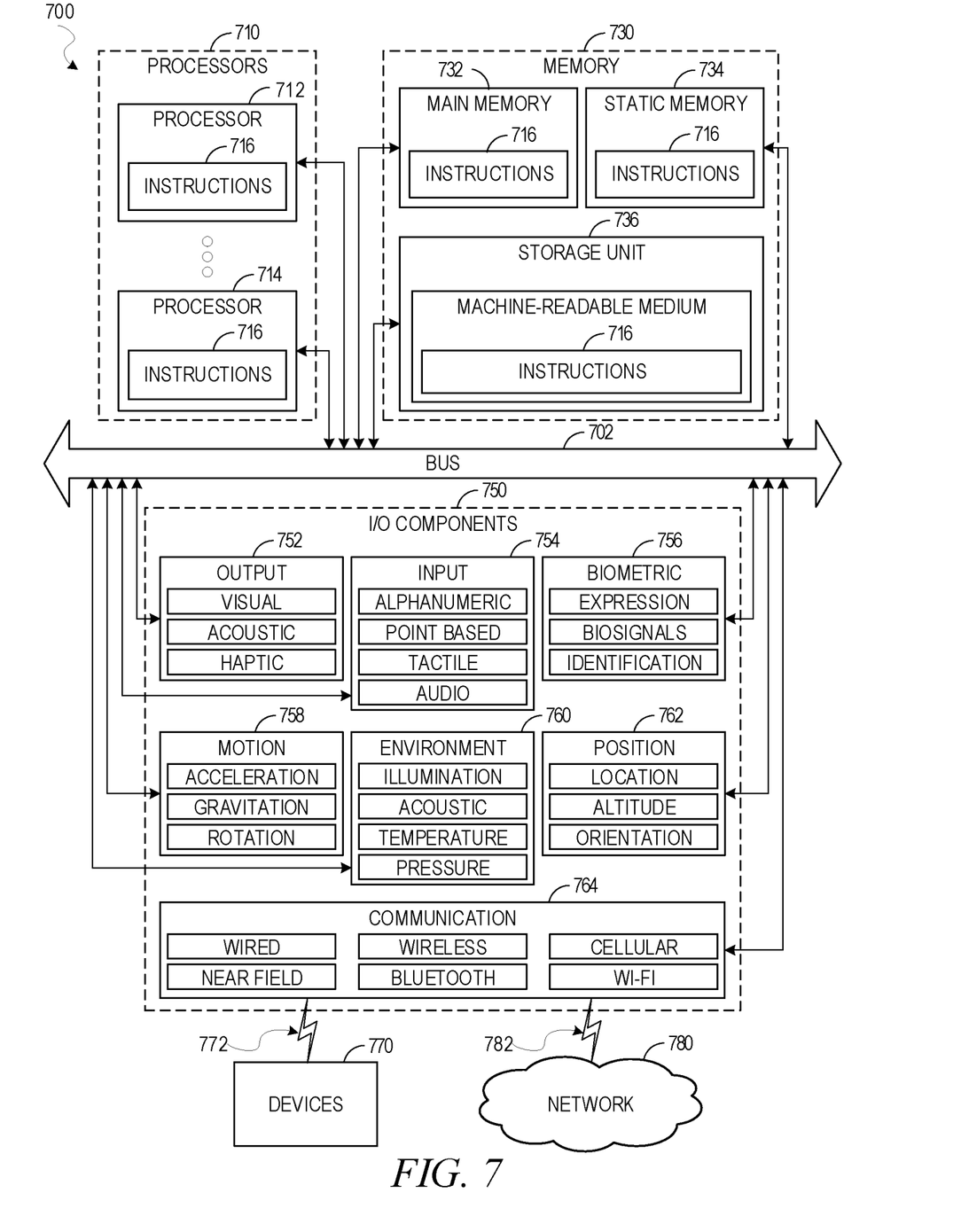
FIG. 7 illustrates a diagrammatic representation of a machine in the form of a computer system within which a set of instructions may be executed for causing the machine to perform any one or more of the methodologies discussed herein.

FIG. 7 illustrates a diagrammatic representation of a machine 700 in the form of a computer system within which a set of instructions may be executed for causing the machine 700 to perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the methods of FIGS. 2 and 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include RFID tag reader components, NFC smart tag detection components, optical reader components (e.g., an optical sensor to detect one-dimensional bar codes such as Universal Product Code (UPC) bar code, multidimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (e.g., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
      receiving, from a data controller, a request to create a privacy view for a microdata table, the request including an identification of an anonymization method, one or more anonymization parameters, and an identification of the microdata table;
      receiving, from the data controller, a request to refresh the privacy view; and
      in response to the receiving of the request to refresh the privacy view:
         accessing a schema of the microdata table using the identification of the microdata table:
         creating a privacy view from the schema using the identified anonymization method;
         generating one or more data transformations for data in the microdata table, based on the identified anonymization method and the one or more anonymization parameters;
         storing the one or more data transformations;
      in response to a data consumer requesting data in the privacy view:
         accessing data in the microdata table using the identification of the microdata table;
         anonymizing the data by transforming the data using the one or more data transformations; and
         filling the privacy view with the transformed data.

2. The system of claim 1, wherein the microdata table corresponds to a service and stores service data having information about one or more servicers having provided the service and one or more customers having received the service.

3. The system of claim 1, wherein the operations are performed by an in-memory database management system.

4. The system of claim 1, wherein the one or more data transformations include aggregating data stored at a first level of a category hierarchy so that it is transformed to data stored at a second level of the category hierarchy, wherein the second level is a higher level than the first level.

5. The system of claim 1, wherein the anonymization method is k-Anonymity and the one or more anonymization parameters include a value for k.

6. The system of claim 5, wherein the one or more anonymization parameters further include a sequence attribute.

7. The system of claim 4, wherein the one or more anonymization parameters further include one or more quasi-identifier attributes specified at a particular level in a generalization hierarchy.

8. A method comprising:
receiving, from a data controller, a request to create a privacy view for a microdata table, the request including an identification of an anonymization method, one or more anonymization parameters, and an identification of the microdata table;
receiving, from the data controller, a request to refresh the privacy view; and
in response to the receiving of the request to refresh the privacy view:
accessing a schema of the microdata table using the identification of the microdata table:
creating a privacy view from the schema using the identified anonymization method;
generating one or more data transformations for data in the microdata table, based on the identified anonymization method and the one or more anonymization parameters;
storing the one or more data transformations;
in response to a data consumer requesting data in the privacy view:
accessing data in the microdata table using the identification of the microdata table;
anonymizing the data by transforming the data using the one or more data transformations; and
filling the privacy view with the transformed data.

9. The method of claim 8, wherein the microdata table corresponds to a service and stores service data having information about one or more servicers having provided the service and one or more customers having received the service.

10. The method of claim 8, wherein the method is performed by an in-memory database management system.

11. The method of claim 8, wherein the one or more data transformations include aggregating data stored at a first level of a category hierarchy so that it is transformed to data stored at a second level of the category hierarchy, wherein the second level is a higher level than the first level.

12. The method of claim 8, wherein the anonymization method is k-Anonymity and the one or more anonymization parameters include a value for k.

13. The method of claim 12, wherein the one or more anonymization parameters further include a sequence attribute.

14. The method of claim 11, wherein the one or more anonymization parameters further include one or more quasi-identifier attributes specified at a particular level in a generalization hierarchy.

15. A non-transitory machine-readable medium storing instructions which, when executed by one or more processors, cause the one or more processors to perform operations comprising:
receiving, from a data controller, a request to create a privacy view for a microdata table, the request including an identification of an anonymization method, one or more anonymization parameters, and an identification of the microdata table;
receiving, from the data controller, a request to refresh the privacy view; and
in response to the receiving of the request to refresh the privacy view:
accessing a schema of the microdata table using the identification of the microdata table:
creating a privacy view from the schema using the identified anonymization method;
generating one or more data transformations for data in the microdata table, based on the identified anonymization method and the one or more anonymization parameters;
storing the one or more data transformations;
in response to a data consumer requesting data in the privacy view:
accessing data in the microdata table using the identification of the microdata table;
anonymizing the data by transforming the data using the one or more data transformations; and
filling the privacy view with the transformed data.

16. The non-transitory machine-readable medium of claim 15, wherein the microdata table corresponds to a service and stores service data having information about one or more servicers having provided the service and one or more customers having received the service.

17. The non-transitory machine-readable medium of claim 15, wherein the one or more data transformations include aggregating data stored at a first level of a category hierarchy so that it is transformed to data stored at a second level of the category hierarchy, wherein the second level is a higher level than the first level.

18. The non-transitory machine-readable medium of claim 15, wherein the anonymization method is k-Anonymity and the one or more anonymization parameters include a value for k.

19. The non-transitory machine-readable medium of claim 18, wherein the one or more anonymization parameters further include a sequence attribute.

20. The non-transitory machine-readable medium of claim 17, wherein the one or more anonymization parameters further include one or more quasi-identifier attributes specified at a particular level in a generalization hierarchy.

* * * * *